(12) United States Patent
Charvet-Quemin et al.

(10) Patent No.: US 12,025,187 B2
(45) Date of Patent: Jul. 2, 2024

(54) ROLLER BEARING

(71) Applicant: NTN-SNR ROULEMENTS, Annecy (FR)

(72) Inventors: Jean-François Charvet-Quemin, Dingy Saint Clair (FR); Vincent Pourroy-Solari, Thones (FR); Louis Redoutey, Entrelacs (FR)

(73) Assignee: NTN-SNR Roulements, Annecy (FR)

( * ) Notice: Subject to any disclaimer, the term of this patent is extended or adjusted under 35 U.S.C. 154(b) by 766 days.

(21) Appl. No.: 17/049,609

(22) PCT Filed: Apr. 26, 2019

(86) PCT No.: PCT/EP2019/060726
§ 371 (c)(1),
(2) Date: Oct. 22, 2020

(87) PCT Pub. No.: WO2019/207103
PCT Pub. Date: Oct. 31, 2019

(65) Prior Publication Data
US 2021/0239162 A1    Aug. 5, 2021

(30) Foreign Application Priority Data

Apr. 26, 2018 (FR) ...................................... 1853695

(51) Int. Cl.
*F16C 41/00* (2006.01)
*F16C 35/063* (2006.01)
*F16C 19/06* (2006.01)
*G01P 3/44* (2006.01)

(52) U.S. Cl.
CPC .......... *F16C 41/007* (2013.01); *F16C 35/063* (2013.01); *F16C 19/06* (2013.01); *F16C 2326/02* (2013.01); *G01P 3/443* (2013.01)

(58) Field of Classification Search
CPC ....... F16C 35/063; F16C 41/007; G01P 3/443
See application file for complete search history.

(56) References Cited

U.S. PATENT DOCUMENTS

| 5,622,437 | A | 4/1997 | Alff |
| 10,324,103 | B2* | 6/2019 | Simonin ............... F16C 33/581 |
| 2021/0246940 | A1* | 8/2021 | Charvet-Quemin ........................ F16C 41/007 |

FOREIGN PATENT DOCUMENTS

| EP | 0521789 A1 | 1/1993 |
| FR | 2826413 A1 | 12/2002 |
| JP | 2000018241 A | 1/2000 |

(Continued)

OTHER PUBLICATIONS

International search report corresponding to PCT/EP2019/060726 dated Jul. 2, 2019.

*Primary Examiner* — James Pilkington
(74) *Attorney, Agent, or Firm* — Murtha Cullina, LLP

(57) ABSTRACT

The invention is a bearing, with an inner member having an inner ring with a raceway and an inner wall assembled around an outer bearing surface of a hub. The outer bearing surface has a groove in which an annular member is arranged having an inner segment axially immobilised in the groove and an outer segment that projects to form an axial stop for the assembly of the inner ring on the hub. The inner member has an encoder. The encoder also has a frame securing it to the inner member. The frame has a stop section between the inner ring and the outer segment.

13 Claims, 3 Drawing Sheets

(56) References Cited

FOREIGN PATENT DOCUMENTS

WO         2010116208 A1    10/2010
WO    WO2016188556     * 12/2016

* cited by examiner

ROLLER BEARING

CROSS-REFERENCE TO RELATED APPLICATIONS

This application claims the benefit of International application number PCT/EP2019/060726, filed Apr. 26, 2019 and French application number 1853695, filed Apr. 26, 2018 the entire contents of which are incorporated herein by reference.

TECHNICAL FIELD

The invention relates to a roller bearing comprising an interior member, an exterior member and rolling bodies disposed in a rolling space formed between the members in order to allow the relative rotation of the interior member with respect to the exterior member.

It applies in particular to a roller bearing for the rotational mounting of the rotor of an electric motor, the interior member being rotatably secured to the rotor and the exterior member being attached to a structure.

BACKGROUND

Roller bearings are known wherein the rotating interior member comprises a ring having a raceway and an interior wall that is associated, in particular by press fitting, around an exterior bearing surface of a hub of the interior member, the hub being in particular able to form part of a rotor or being in the form of a sleeve associated with such a rotor.

In order to make the association of the ring on the hub reliable, providing a groove on the exterior bearing surface of the hub is known, wherein an annular member is disposed having an interior segment axially immobilised in the groove and an exterior segment projecting from the groove in order to form an axial abutement for the association.

In particular in this type of assembly, it is desirable to know, in real time and with optimum reliability, at least one piece of information relating to the rotation of the rotating member, for example a rotation parameter such as its the position, speed, acceleration or the direction of rotation.

To do this, devices are known comprising an encoder having a track that is able to generate a signal representative of the rotation thereof, as well as a sensor able to determine such information by detecting the signal generated. Thus, by equipping the rotating interior member with the encoder and attaching the sensor at a distance for reading the signal generated by the encoder, it is possible to determine at least one piece of information related to the rotation of the member.

Advantageously, the encoder comprises a reinforcement, a section of which is rotatably associated on a wall of the rotating member, the association section being surrounded by a peripheral wall on which the track is disposed.

However, the problem is then posed of the mechanical strength of the reinforcement on the member during rotation thereof, and this more particularly when the rotation speed is high, such as in electric motors.

This is because possible movements and/or deformations of the reinforcement cause variations in positioning of the encoding track with respect to the sensor, which impairs the reliability of the detection of the signal.

SUMMARY OF THE INVENTION

The aim of the invention is to improve the prior art by proposing in particular a roller bearing wherein an encoder is secured to the rotating interior member in a particularly reliable fashion, and this even in the case of high rotation speed of the rotating member.

To this end, the invention proposes a roller bearing comprising an exterior member and an interior member comprising a ring having a raceway and an interior wall which is associated around an exterior bearing surface of a hub of the interior member, the bearing surface comprising a groove in which an annular member is arranged by having an interior segment axially immobilised in the groove and an exterior segment that projects from the groove to form an axial abutment of the association of the ring on the hub, the interior member being equipped with an encoder having an track capable of generating a signal representative of its rotation, the encoder comprising a reinforcement for rotatably securing to the interior member, the reinforcement having a stop section that is interposed between the interior ring and the exterior segment of the annular member, the interior ring being in axial abutment on the exterior segment by means of the stop section.

BRIEF DESCRIPTION OF THE DRAWING

Other objects and advantages of the invention will emerge in the following description made with reference to the accompanying figures, wherein.

DETAILED DESCRIPTION

In relation to these figures, a roller bearing is described below, in particular for the rotational mounting of the rotor of an electric motor.

The bearing comprises an interior member 1 and an exterior member 2 delimiting between them a rolling space wherein rolling bodies 3 are disposed to allow the relative rotation of the interior member with respect to the exterior member about an axis.

Figure 1:
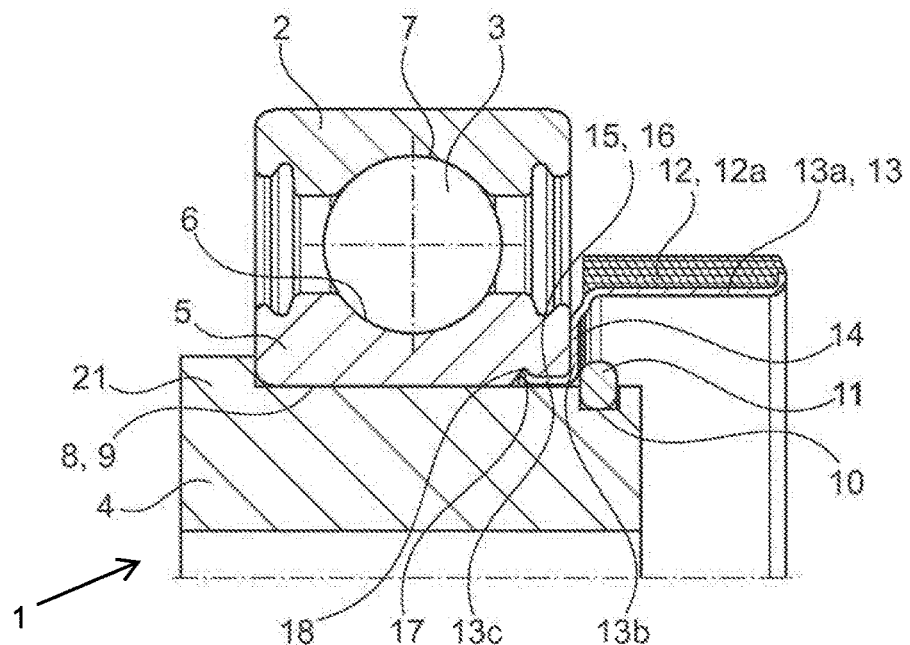
FIG. 1 is a partial view in longitudinal section of a roller bearing according to an embodiment of the invention, FIG. 1a being an enlarged view of FIG. 1.
Figures 1A, 2:
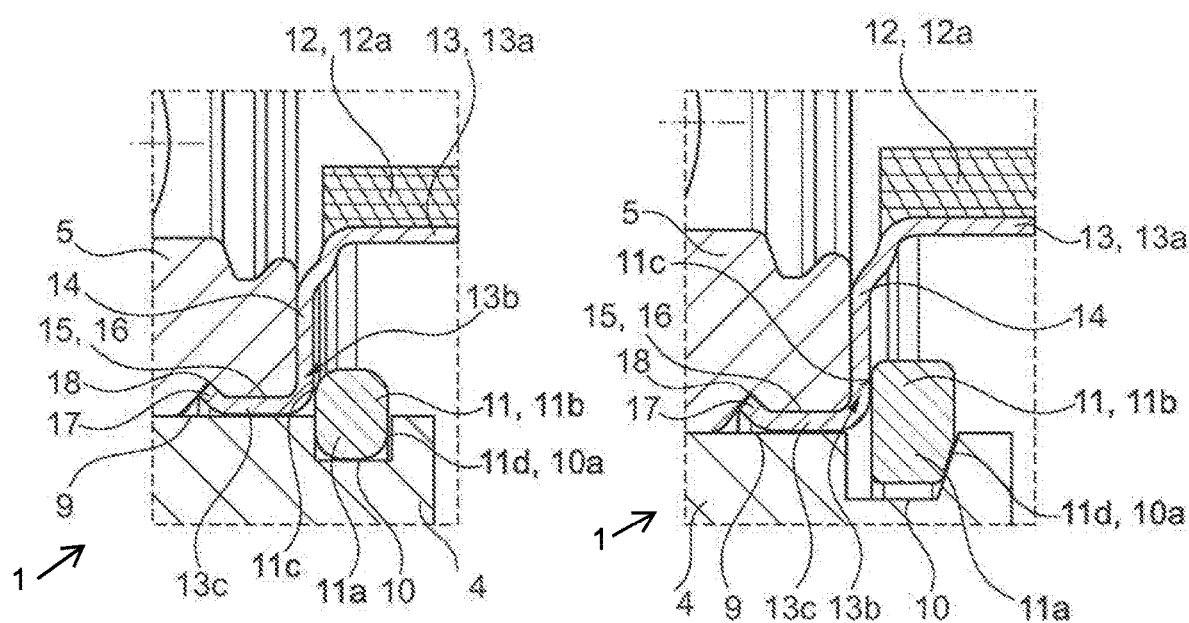
FIG. 2 is an enlarged view similar to FIG. 1a showing a variant embodiment according to the invention.

In this description, the terms for positioning in space are taken with reference to the rotation axis of the bearing (horizontal in FIGS. 1 and 1a). In particular, the term "interior" relates to an arrangement close to this axis and the term "exterior" relates to an arrangement at a distance from this axis.

In the application considered, the rotating interior member 1 comprises a hub 4, for example forming part of a rotor of an electric motor, or in the form of a sleeve associated with such a rotor, the exterior member 2 being attached to a structure.

The interior member 1 comprises an interior ring 5 having an exterior raceway. Likewise, the exterior member 2 comprises an exterior ring that is mounted around the interior ring 5 while having an interior raceway 7 that is disposed radially opposite the exterior raceway 6, the raceways 6, 7 forming between them a rolling track for a row of rolling bodies 3 formed as balls.

However, the invention is not limited to any particular embodiment of the geometry of the bearing, in particular with respect to the geometries of the rolling bodies 3 and/or of the members 1, 2.

The interior ring 5 has an interior wall 8 that is associated around an exterior bearing surface 9 of the hub 4. In particular, the hub 4 has a front edge 21 extending radially from a front end of the exterior bearing surface 9, the interior ring 5 being associated by heat shrinkage on the bearing surface while coming into axial abutment on the edge.

Figure 3:
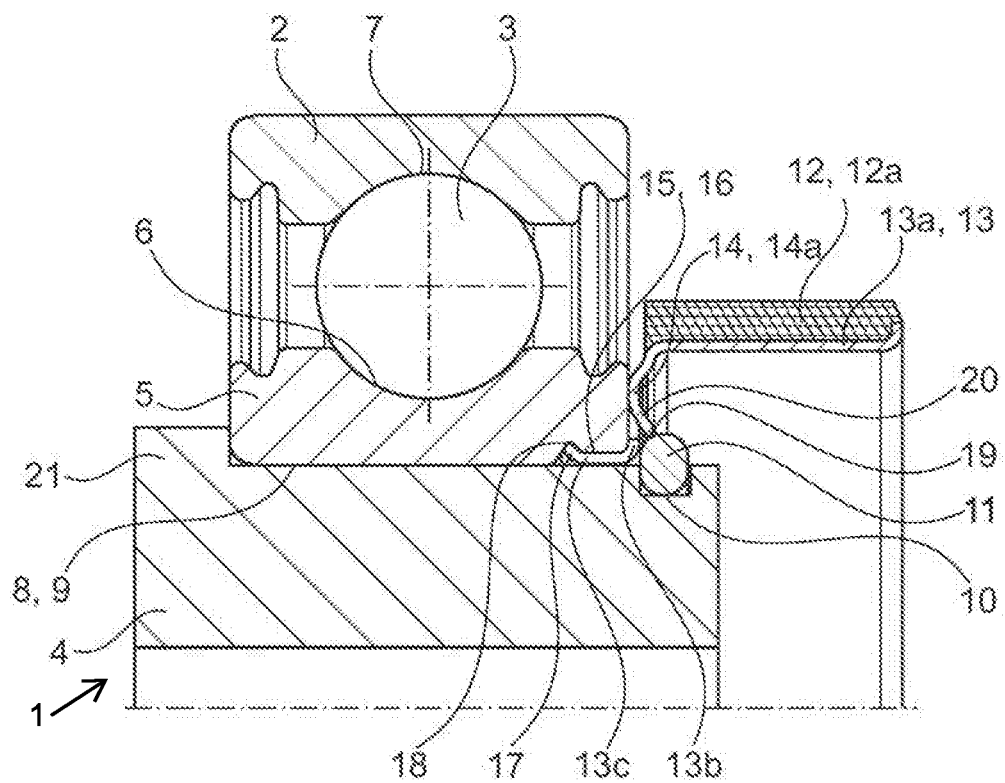
FIG. 3 is a partial view in longitudinal section of a roller bearing according to another embodiment of the invention, FIG. 3a being an enlarged view of FIG. 3.
Figure 3A:
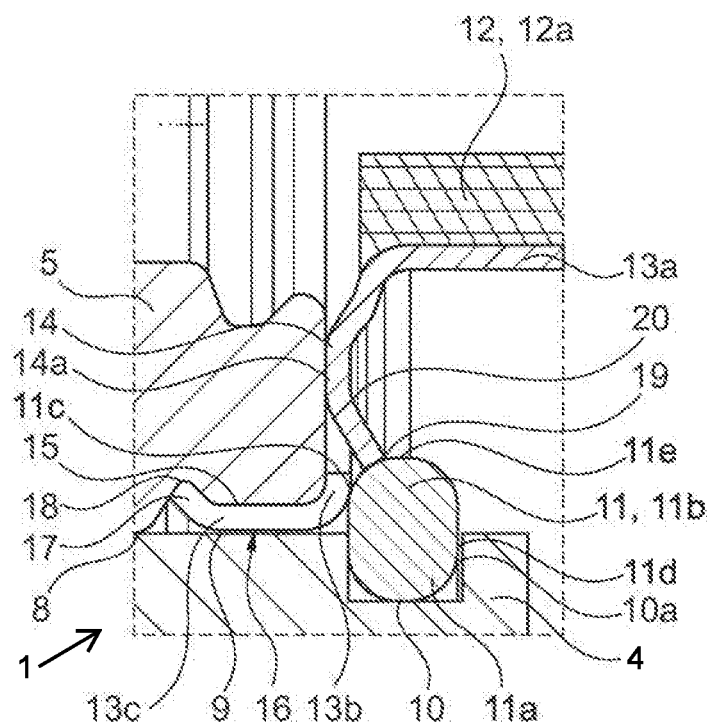

In the description, the terms "front" and "rear" relate to an arrangement with respect to the direction of heat shrinkage of the interior ring 5 on the hub 4, namely respectively to left and right in FIGS. 1 and 3*a*.

In order to make the association of the ring 5 on the hub reliable, the exterior bearing surface 9 comprises a rear groove 10 wherein an annular member 11 is disposed, having an interior segment 11*a* immobilised axially in the groove and an exterior segment 11*b* projecting from the groove in order to form a rear axial abutment of the association of the ring on the hub. Thus the interior ring 5 is axially immobilised between the front edge 21 and the annular member 11.

Advantageously, the annular member 11 is an elastic ring, whose diameter may be reversibly varied to enable its mounting in the groove 10.

According to one embodiment, the annular member 11 has a split annular geometry, i.e. "circlip" type.

In order to know, in real time and with optimum reliability, at least one piece of information related to the rotation of the rotating member 1, for example a rotation parameter such as its position, speed, acceleration or direction of rotation, the interior member is equipped with an encoder 12 having an track 12*a* that is able to generate a signal representative of its rotation.

The encoder 12 comprises a reinforcement 13 for rotatably securing to the interior member 1, the reinforcement having an exterior section 13*a* on which the track 12*a* is disposed. Advantageously, the reinforcement 13 is produced from pressed metal sheet in order to shape it in accordance with the required annular geometry.

In particular, the exterior section 13*a* has an exterior face that is covered with a material able to generate the signal. According to one embodiment, the track 12*a* is magnetic, in particular multipolar, having an alternating succession of pairs of north and south poles that extends in the rotation direction of the encoder 12. Thus the track 12*a* is able to emit a periodic magnetic signal representative of the movement of the encoder 12, in particular a signal of pseudosinusoidal shape. According to an advantageous embodiment, the encoder 12 may have two or three encoding tracks 12*a*, for example disposed concentrically, in order to be able to determine the required rotation information.

In particular, a magnet may be associated on the exterior section 13*a*, the magnet being able to be formed by an annular matrix, for example produced from a plastics or elastomer material, wherein magnetic particles are dispersed, in particular ferrite or rare-earth particles such as NdFeB, the matrix being moulded onto the exterior section 13*a*.

The rolling bearing further comprises a sensor (not shown) able to detect the signal generated by the encoding track or tracks 12*a*, the sensor being disposed at a reading distance from the track or tracks, the sensor further comprising means for processing the signal in order to determine the required rotation information.

The reinforcement 13 has a stop section 13*b* that is interposed between the interior ring 5 and the exterior segment 11*b* of the ring 11, the interior ring being in axial abutment on the exterior segment by means of the stop section.

Thus the annular member 11, in addition to making the association of the ring 5 on the hub 4 reliable, makes the rotational securing of the encoder 12 on the interior member 1 reliable, and this even during a rotation at high speed of the interior member.

In particular, the annular member 11 makes it possible to limit the risks of displacements and/or deformations of the reinforcement 13 in order to guarantee reliability of the information read by the sensor, by limiting the risks of variations in the positioning of the encoding track 12*a* with respect to the hub 4.

The annular member 11 has a front face 11*c* on which the stop section 13*b* is in axial abutment, and a rear face 11*d* in abutment on a complementary face 10*a* of the groove 10. In relation to the figures, the rear face 11*d* and the complementary face 10*a* extend radially.

Advantageously, the rear face 11*d* and/or the complementary face 10*a* may have a frustoconical profile that is arranged so that a radial clamping of the annular member 11 in the groove 10 causes an axial force of pressing the front face 11*c* on the stop section 13*b*. In particular, FIG. 2 shows a variant wherein the rear face 11*d* and the complementary face 10*a* both have such a frustoconical profile.

In the embodiments shown, the stop section 13*b* extends radially between a face of the ring 5 and the exterior segment 11*b*. In particular, the reinforcement 13 has a radial wall 14 on which the stop section 13*b* is formed. Moreover, the exterior section 13*a* extends substantially axially outside the stop section 13*b*.

In order to make the securing of the encoder 12 to the rotating member 11 even more reliable, the reinforcement 13 has a section 13*c* for association on the interior ring 5. In the figures, the association section 13*c* extends substantially axially inside the stop section 13*b*.

The association section 13*c* may in particular be attached to an interior wall 15 of the ring 5. In the embodiments shown, the interior wall 15 is disposed opposite the bearing surface 9 of the hub 4, the association section 13*c* being immobilised radially between the wall 15 and the bearing surface. In particular, the ring 5 has a recess 16 in which the interior wall 15 extends, forming a housing for the association section 13*c*.

Advantageously, the association section 13*c* has a means for the axial holding of the reinforcement 13 on the ring 5, in order to reinforce the holding of the encoder 12 on the rotating member 1.

To do this, in relation to FIGS. 1 and 1*a*, the association section 13*c* has a radial fold 17 forming such an axial holding means. Moreover, the interior wall 15 has a notch 18 formed at the front of the housing, in which the radial fold 17 is disposed in axial abutment.

Figure 4:
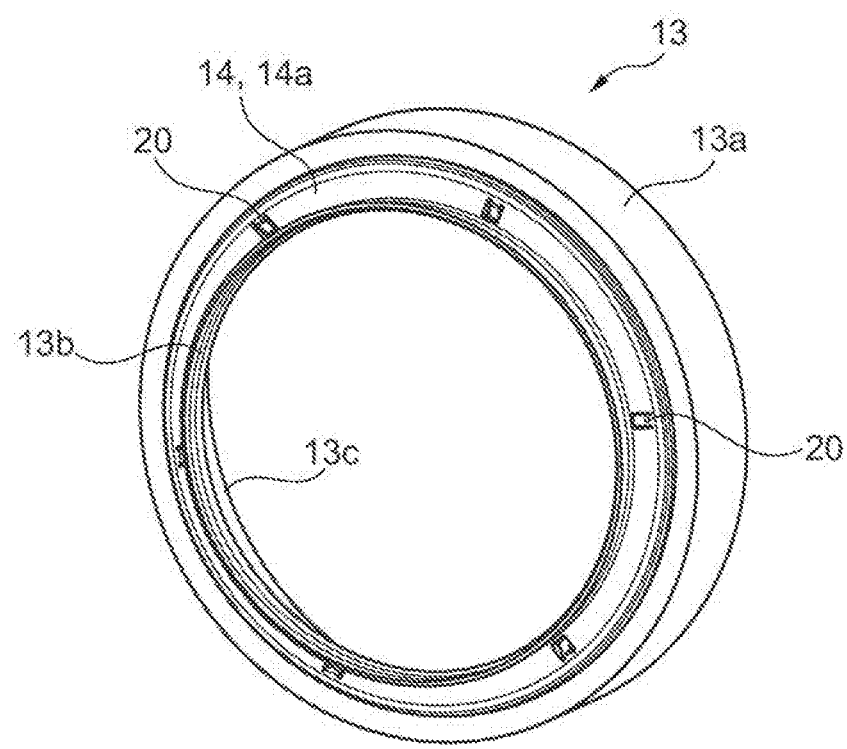
FIG. 4 is a perspective view of the reinforcement in FIGS. 3 and 3a, FIG. 4a being an enlarged view of FIG. 4.
Figure 4A:
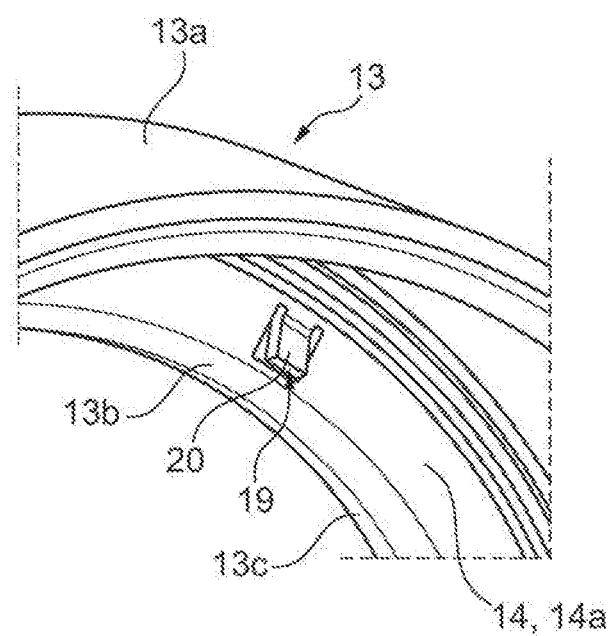

In relation to FIGS. 3 to 4, the securing reinforcement 13 has at least one projection 19 that is disposed around the annular member 11 in order to prevent a radial movement of the annular member in the groove 10.

Thus the holding of the annular 11 in the groove 10 is improved, which makes the securing of the ring 5 to the hub reliable, and this even in the case of rotation at high speed.

In FIGS. 3 and 3*a*, the projection 19 is disposed to interfere on an exterior wall 11*e* of the ring 11, in order to hold the ring in the groove 10 by radial interference of the projection on the exterior wall. According to one embodiment, the exterior wall 11e is in radial abutment on the projection 19, for example by providing for the inscribed diameter on the projection to be less than the outside diameter of the wall when the ring is in a stable position.

In particular, the projection 19 is formed on the radial wall 14 comprising the stop section 13b, in particular outside the stop section. In the embodiment shown, the radial wall 14 has a crown 14a formed outside the stop section 13b and extending radially around the ring 11, the crown having at least one lug 20, the free end 19 of which is disposed axially projecting around the ring 11, to come into radial interference with the exterior wall 11e.

Advantageously, the lug 20 is formed by a cutout in the crown 14a, in order to facilitate manufacture of the reinforcement 13.

Furthermore, the reinforcement 13 has a plurality of projections 19 that are distributed angularly on the crown 14a, in particular with a constant angular pitch, in order to ensure even holding of the ring 11 over the circumference thereof.

What is claimed is:

1. A roller bearing comprising:
    an exterior member and an interior member defining between them a rolling space in which rolling bodies are disposed to allow the relative rotation of the interior member with respect to the exterior member;
    the interior member comprising an interior ring having a raceway and a first interior wall which is associated axially with an exterior bearing surface of a hub of the interior member;
    the exterior bearing surface comprising a groove in which an annular member is arranged by having an interior segment axially immobilised in the groove and an exterior segment that projects from the groove to form an axial abutment of the association of the interior ring on the hub;
    the interior member being equipped with an encoder;
    the encoder comprising a reinforcement for rotatably securing to the interior member; and
    wherein the reinforcement has a stop section that is interposed between the interior ring and the exterior segment of the annular member, the interior ring being in axial abutment with the stop section and the exterior segment.

2. A roller bearing according to claim 1, wherein the stop section extends radially between a face of the interior ring and the exterior segment.

3. A roller bearing according to claim 1, wherein the reinforcement has an exterior section on which the encoding track is disposed.

4. A roller bearing according to claim 1, wherein the reinforcement has an association section attached to the interior ring.

5. A roller bearing according to claim 4, wherein the association section extends substantially axially along the axis of rotation and interior the stop section.

6. A roller bearing according to claim 4, wherein the association section is attached to a second interior wall of the interior ring.

7. A roller bearing according to claim 6, wherein the second interior wall is disposed opposite to the bearing surface of the hub, the association section being immobilised radially between the second interior wall and the bearing surface of the hub.

8. A roller bearing according to claim 7, wherein the interior ring has a recess in which the interior wall extends, forming a housing for the association section.

9. A roller bearing according to claim 4, wherein the association section has a means for axial holding of the reinforcement on the interior ring.

10. A roller bearing according to claim 9, wherein the means for axial holding is a radial fold.

11. A roller bearing according to claim 10, wherein the radial fold is disposed in axial abutment in a notch in the interior wall of the interior ring.

12. A roller bearing according to claim 1, wherein the annular member has a front face on which the stop section is in axial abutment, and a rear face in abutment on a complementary face of the groove.

13. A roller bearing according to claim 12, wherein the rear face and/or the complementary face has a frustoconical profile that is arranged so that a radial clamping of the annular member in the groove causes an axial force that presses the front face on the stop section.

* * * * *